United States Patent
Ames

(10) Patent No.: US 11,673,265 B2
(45) Date of Patent: Jun. 13, 2023

(54) MOTION PLANNING FOR ROBOTS TO OPTIMIZE VELOCITY WHILE MAINTAINING LIMITS ON ACCELERATION AND JERK

(71) Applicant: REALTIME ROBOTICS, INC., Boston, MA (US)

(72) Inventor: Christopher Barrett Ames, Durham, NC (US)

(73) Assignee: REALTIME ROBOTICS, INC., Boston, MA (US)

( * ) Notice: Subject to any disclaimer, the term of this patent is extended or adjusted under 35 U.S.C. 154(b) by 328 days.

(21) Appl. No.: 16/999,339

(22) Filed: Aug. 21, 2020

(65) Prior Publication Data

US 2021/0053220 A1     Feb. 25, 2021

Related U.S. Application Data

(60) Provisional application No. 62/890,830, filed on Aug. 23, 2019.

(51) Int. Cl.
    *B25J 9/16*                 (2006.01)

(52) U.S. Cl.
    CPC ............ *B25J 9/1651* (2013.01); *B25J 9/1648* (2013.01); *B25J 9/1664* (2013.01)

(58) Field of Classification Search
    CPC ...... B25J 9/1648; B25J 9/1651; B25J 9/1664; G05B 2219/40454
    See application file for complete search history.

(56) References Cited

U.S. PATENT DOCUMENTS

| | | | |
|---|---|---|---|
| 4,862,373 A | 8/1989 | Meng | |
| 4,949,277 A | 8/1990 | Trovato et al. | |
| 5,347,459 A | 9/1994 | Greenspan et al. | |
| 5,544,282 A | 8/1996 | Chen et al. | |

(Continued)

FOREIGN PATENT DOCUMENTS

| | | |
|---|---|---|
| EP | 1901150 A1 | 3/2008 |
| EP | 2306153 A2 | 4/2011 |

(Continued)

OTHER PUBLICATIONS

Ratliff; "CHOMP: Gradient Optimization Techniques for Efficient Motion Planning"; 2009 IEEE International Conference on Robotics and Automation; pp. 489-494 (Year: 2009).*

(Continued)

*Primary Examiner* — Stephen Holwerda
(74) *Attorney, Agent, or Firm* — Cozen O'Connor

(57) ABSTRACT

Faster, less computational intense, and more robust techniques to optimize velocity of robots or portions thereof without violating constraints on acceleration and jerk (derivative of acceleration with respect to time) are described. A nonlinear problem of optimizing velocity without violating acceleration constraints is linearized, and produces acceleration constrained velocity estimates. A nonlinear problem of optimizing velocity without violating jerk constraints in linearized, and produces jerk constrained velocity estimates, and may be feed by the acceleration constrained velocity estimates. Configuration and timing may be generated and provided, e.g., as vectors, to control operation of a robot, robotic appendage or other structure.

24 Claims, 3 Drawing Sheets

(56) References Cited

U.S. PATENT DOCUMENTS

| | | | |
|---|---|---|---|
| 6,004,016 A | 12/1999 | Spector | |
| 6,049,756 A | 4/2000 | Libby | |
| 6,089,742 A | 7/2000 | Warmerdam et al. | |
| 6,259,988 B1 | 7/2001 | Galkowski et al. | |
| 6,493,607 B1 | 12/2002 | Bourne et al. | |
| 6,526,372 B1 | 2/2003 | Orschel et al. | |
| 6,526,373 B1 | 2/2003 | Barral | |
| 6,539,294 B1 | 3/2003 | Kageyama | |
| 7,865,277 B1 | 1/2011 | Larson et al. | |
| 8,315,738 B2 | 11/2012 | Chang et al. | |
| 8,571,706 B2 | 10/2013 | Zhang et al. | |
| 8,666,548 B2 | 3/2014 | Lim | |
| 8,825,207 B2 | 9/2014 | Kim et al. | |
| 8,855,812 B2 | 10/2014 | Kapoor | |
| 8,972,057 B1 | 3/2015 | Freeman et al. | |
| 9,102,055 B1 | 8/2015 | Konolige et al. | |
| 9,280,899 B2 | 3/2016 | Biess et al. | |
| 9,632,502 B1 | 4/2017 | Levinson et al. | |
| 9,645,577 B1 | 5/2017 | Frazzoli et al. | |
| 9,687,982 B1 | 6/2017 | Jules et al. | |
| 9,687,983 B1 | 6/2017 | Prats | |
| 9,731,724 B2 | 8/2017 | Yoon | |
| 9,981,383 B1 | 5/2018 | Nagarajan | |
| 10,035,266 B1* | 7/2018 | Kroeger | B25J 9/1664 |
| 10,099,372 B2 | 10/2018 | Vu et al. | |
| 10,124,488 B2 | 11/2018 | Lee et al. | |
| 10,131,053 B1 | 11/2018 | Sampedro et al. | |
| 10,430,641 B2 | 10/2019 | Gao | |
| 10,705,528 B2 | 7/2020 | Wierzynski et al. | |
| 10,723,024 B2 | 7/2020 | Konidaris et al. | |
| 10,782,694 B2 | 9/2020 | Zhang et al. | |
| 2002/0074964 A1* | 6/2002 | Quaschner | G05B 19/404 318/560 |
| 2003/0155881 A1 | 8/2003 | Hamann et al. | |
| 2004/0249509 A1* | 12/2004 | Rogers | G05B 19/4103 700/245 |
| 2005/0071048 A1 | 3/2005 | Watanabe et al. | |
| 2005/0216181 A1 | 9/2005 | Estkowski et al. | |
| 2006/0235610 A1 | 10/2006 | Ariyur et al. | |
| 2006/0247852 A1 | 11/2006 | Kortge et al. | |
| 2007/0112700 A1 | 5/2007 | Den et al. | |
| 2008/0125893 A1 | 5/2008 | Tilove et al. | |
| 2008/0234864 A1 | 9/2008 | Sugiura et al. | |
| 2009/0192710 A1 | 7/2009 | Eidehall et al. | |
| 2009/0295323 A1 | 12/2009 | Papiernik et al. | |
| 2009/0326711 A1 | 12/2009 | Chang et al. | |
| 2009/0326876 A1 | 12/2009 | Miller | |
| 2010/0235033 A1 | 9/2010 | Yamamoto et al. | |
| 2011/0066282 A1 | 3/2011 | Bosscher et al. | |
| 2011/0153080 A1 | 6/2011 | Shapiro et al. | |
| 2012/0010772 A1 | 1/2012 | Pack et al. | |
| 2012/0083964 A1 | 4/2012 | Montemerlo et al. | |
| 2012/0215351 A1 | 8/2012 | Mcgee et al. | |
| 2014/0012419 A1* | 1/2014 | Nakajima | B25J 9/1664 700/261 |
| 2014/0025201 A1 | 1/2014 | Ryu et al. | |
| 2014/0025203 A1 | 1/2014 | Inazumi | |
| 2014/0067121 A1 | 3/2014 | Brooks et al. | |
| 2014/0121833 A1 | 5/2014 | Lee et al. | |
| 2014/0147240 A1 | 5/2014 | Noda et al. | |
| 2014/0249741 A1 | 9/2014 | Levien et al. | |
| 2014/0251702 A1 | 9/2014 | Berger et al. | |
| 2014/0309916 A1 | 10/2014 | Bushnell | |
| 2015/0051783 A1 | 2/2015 | Tamir et al. | |
| 2015/0134111 A1* | 5/2015 | Nakajima | B25J 9/1664 901/9 |
| 2015/0261899 A1 | 9/2015 | Atohira et al. | |
| 2015/0266182 A1 | 9/2015 | Strandberg | |
| 2016/0107313 A1 | 4/2016 | Hoffmann et al. | |
| 2016/0112694 A1 | 4/2016 | Nishi et al. | |
| 2016/0121487 A1 | 5/2016 | Mohan et al. | |
| 2016/0154408 A1 | 6/2016 | Eade et al. | |
| 2016/0177520 A1 | 6/2016 | Wilhelm et al. | |
| 2016/0299507 A1 | 10/2016 | Shah et al. | |
| 2016/0357187 A1 | 12/2016 | Ansari | |
| 2017/0004406 A1 | 1/2017 | Aghamohammadi | |
| 2017/0028559 A1 | 2/2017 | Davidi et al. | |
| 2017/0120448 A1 | 5/2017 | Lee et al. | |
| 2017/0123419 A1 | 5/2017 | Levinson et al. | |
| 2017/0132334 A1 | 5/2017 | Levinson et al. | |
| 2017/0146999 A1 | 5/2017 | Cherepinsky et al. | |
| 2017/0157769 A1 | 6/2017 | Aghamohammadi et al. | |
| 2017/0168485 A1 | 6/2017 | Berntorp et al. | |
| 2017/0168488 A1 | 6/2017 | Wierzynski et al. | |
| 2017/0193830 A1 | 7/2017 | Fragoso et al. | |
| 2017/0210008 A1 | 7/2017 | Maeda | |
| 2017/0305015 A1 | 10/2017 | Krasny et al. | |
| 2018/0001472 A1 | 1/2018 | Konidaris et al. | |
| 2018/0001476 A1 | 1/2018 | Tan et al. | |
| 2018/0029233 A1 | 2/2018 | Lager | |
| 2018/0074505 A1 | 3/2018 | Lv et al. | |
| 2018/0113468 A1 | 4/2018 | Russell | |
| 2018/0136662 A1 | 5/2018 | Kim | |
| 2018/0150077 A1 | 5/2018 | Danielson et al. | |
| 2018/0172450 A1 | 6/2018 | Lalonde et al. | |
| 2018/0173242 A1 | 6/2018 | Lalonde et al. | |
| 2018/0222051 A1 | 8/2018 | Vu et al. | |
| 2018/0229368 A1* | 8/2018 | Leitner | B25J 9/1602 |
| 2018/0281786 A1 | 10/2018 | Oyaizu et al. | |
| 2019/0143518 A1 | 5/2019 | Maeda | |
| 2019/0163191 A1 | 5/2019 | Sorin et al. | |
| 2019/0164430 A1 | 5/2019 | Nix | |
| 2019/0196480 A1 | 6/2019 | Taylor | |
| 2019/0232496 A1 | 8/2019 | Graichen et al. | |
| 2019/0262993 A1 | 8/2019 | Cole et al. | |
| 2019/0293443 A1 | 9/2019 | Kelly et al. | |
| 2019/0391597 A1 | 12/2019 | Dupuis | |
| 2020/0069134 A1 | 3/2020 | Ebrahimi Afrouzi et al. | |
| 2020/0097014 A1 | 3/2020 | Wang | |
| 2020/0331146 A1 | 10/2020 | Vu et al. | |
| 2020/0338730 A1 | 10/2020 | Yamauchi et al. | |
| 2020/0338733 A1 | 10/2020 | Dupuis et al. | |
| 2020/0353917 A1 | 11/2020 | Leitermann et al. | |
| 2020/0368910 A1 | 11/2020 | Chu et al. | |

FOREIGN PATENT DOCUMENTS

| | | |
|---|---|---|
| EP | 3250347 A1 | 12/2017 |
| EP | 3486612 A1 | 5/2019 |
| EP | 3725472 A1 | 10/2020 |
| JP | 11296229 A | 10/1999 |
| JP | 2002073130 A | 3/2002 |
| JP | 2003127077 A | 5/2003 |
| JP | 2006224740 A | 8/2006 |
| JP | 2008065755 A | 3/2008 |
| JP | 2010061293 A | 3/2010 |
| JP | 2011075382 A | 4/2011 |
| JP | 2011249711 A | 12/2011 |
| JP | 2012056023 A | 3/2012 |
| JP | 2012190405 A | 10/2012 |
| JP | 2012243029 A | 12/2012 |
| JP | 2013193194 A | 9/2013 |
| JP | 2014184498 A | 10/2014 |
| JP | 2015044274 A | 3/2015 |
| JP | 2015517142 A | 6/2015 |
| JP | 2015208811 A | 11/2015 |
| KR | 19980024584 A | 7/1998 |
| KR | 20110026776 A | 3/2011 |
| KR | 20130112507 A | 10/2013 |
| KR | 20170018564 A | 2/2017 |
| KR | 20170044987 A | 4/2017 |
| KR | 20170050166 A | 5/2017 |
| KR | 20180125646 A | 11/2018 |
| TW | 201318793 A | 5/2013 |
| WO | 9924914 A1 | 5/1999 |
| WO | 2015113203 A1 | 8/2015 |
| WO | 2016122840 A1 | 8/2016 |
| WO | 2017168187 A1 | 10/2017 |
| WO | 2017214581 A1 | 12/2017 |
| WO | 2018505788 A | 3/2018 |
| WO | 2019183141 A1 | 9/2019 |

(56) References Cited

FOREIGN PATENT DOCUMENTS

| WO | 2020040979 A1 | 2/2020 |
|---|---|---|
| WO | 2020117958 A1 | 6/2020 |

OTHER PUBLICATIONS

Sicilliano et al. "Robotics. Modelling, Planning and Control", Chapter 12: Motion Planning, pp. 523-559, 2009.
Chen, Chao, Motion Planning for Nonholonomic Vehicles with Space Exploration Guided Heuristic Search, 2016, IEEE.com, Whole Document, 140 pages.
Pan, Jia, et al., Efficient Configuration Space Construction and Optimization for Motion Planning, 2015, Research Robotics, Whole Document, 12 pages.
Non-Final Office Action Issued in U.S. Appl. No. 16/240,086, dated Feb. 11, 2021, 79 pages.
International Search Report and Written Opinion for PCT/US2021/061427, dated Apr. 29, 2022, 14 pages.
Non-Final Office Action Issued in U.S. Appl. No. 16/909,096 dated May 6, 2022, 49 pages.
European Search Report issued in European Application No. 19771537.8, dated Mar. 29, 2021, 8 pages.
Final Office Action Issued in U.S. Appl. No. 16/268,290, dated Apr. 21, 2021, 58 pages.
Murray, Sean, et al., "Robot Motion Planning on a Chip", Robotics: Science and Systems, Jan. 1, 2016, 9 pages.
Rodriguez, Carlos, et al., "Planning manipulation movements of a dual-arm system considering obstacle removing", Robotics and Autonomous Systems 62 (2014), Elsevier, Journal homepage: www.elsevier.com/locate/robot, pp. 1816-1826.
Notice of Allowance dated Sep. 23, 2021, for Ritchey, "Motion Planning for Autonomous Vehicles and Reconfigurable Motion Planning Processors," U.S. Appl. No. 16/615,493, 11 pages.
Notice of Allowance dated Sep. 24, 2021, for Ritchey, "Motion Planning of a Robot Storing a Discretized Environment on One or More Processors and Improved Operation of Same," U.S. Appl. No. 16/268,290, 8 pages.
Communication Pursuant to Article 94(3) EPC, issued in European Application No. 17811131.6, dated Jun. 16, 2020, 5 pages.
Communication Pursuant to Article 94(3) EPC, issued in European Application No. 18209405.2, dated Nov. 23, 2020, 4 pages.
European Search Report dated Nov. 17, 2020 for EP Application No. 16743821.7, 4 pages.
Extended European Search Report dated Apr. 10, 2018 for EP Application No. 16743821.7, in 9 pages.
Extended European Search Report issued in European Application No. 17811131.6, dated Apr. 24, 2019, 16 pages.
Extended European Search Report issued in European Application No. 18209405.2, dated Aug. 2, 2019, 9 pages.
First Office Action issued in Chinese No. 201680006941.3 with English translation, dated Sep. 29, 2019, 16 pages.
First Office Action issued in Japanese Patent Application No. 2017-557268, dated Aug. 7, 2018, 15 pages.
International Search Report and Written Opinion dated Jul. 29, 2020, in PCT/US2020/028343, 11 pages.
International Search Report and Written Opinion for PCT/US2019/016700, dated May 20, 2019, 14 pages.
International Search Report and Written Opinion for PCT/US2019/023031, dated Aug. 14, 2019 in 19 pages.
International Search Report and Written Opinion for PCT/US2019/064511, dated Mar. 27, 2020, 10 pages.
International Search Report and Written Opinion issued in PCT Application No. PCT/2020/034551, dated Aug. 31, 2020, 18 pages.
International Search Report and Written Opinion issued in PCT Application No. PCT/US2016/012204; dated Mar. 21, 2016, 10 pages.
International Search Report and Written Opinion issued in PCT Application No. PCT/US2017/036880; dated Oct. 10, 2017, 15 pages.
International Search Report and Written Opinion issued in PCT Application No. PCT/US2019/045270; dated Nov. 25, 2019, 11 pages.
International Search Report and Written Opinion issued in PCT/US2019/012209, dated Apr. 25, 2019, 24 pages.
International Search Report and Written Opinion, dated Nov. 23, 2020, for PCT/US2020/047429, 11 Pages.
International Search Report and Written Opinion, dated Jun. 23, 2020 for PCT/US2020/039193, 9 pages.
Invitation to Pay Additional Fees and, Where Applicable, Protest Fee issued in PCT/US2017/036880, dated Aug. 14, 2017, 2 pages.
Non-Final Office Action Issued in U.S. Appl. No. 16/308,693, dated Dec. 11, 2020, 17 pages.
Non-Final Office Action Issued in U.S. Appl. No. 16/308,693, dated Jun. 1, 2020, 16 pages.
Non-Final Office Action Issued in U.S. Appl. No. 15/546,441, dated Sep. 17, 2019, 58 pages.
Office Action Issued in Japanese Application No. 2018-564836, dated Dec. 3, 2019, 3 pages.
Office Action Issued in Japanese Application No. 2018-564836, dated May 19, 2020, 5 Pages.
Or.pdf (or | Definition of or by Merriam-Webster, Sep. 9, 2019, https://www.merriam-webster.com/dictionary/or, pp. 1-12; Year: 2019.
Second Office Action issued in Japanese Patent Application No. 2017-557268, dated Feb. 26, 2019, 5 pages.
Atay, Nuzhet, et al., "A Motion Planning Processor on Reconfigurable Hardware", All Computer Science and Engineering Research, Computer Science and Engineering; Report No. WUCSE-2005-46; Sep. 23, 2005.
Hauck, Scott, et al., "Configuration Compression for the Xilinx XC6200 FPGA", IEEE Transactions on Computer-Aided Design of Integrated Circuits and Systems, vol. 18, No. 8; Aug. 1999.
Johnson, David E., et al., "Bound Coherence for Minimum Distance Computations", Proceedings of the 1999 IEEE International Conference on Robotics and Automation, May 1999.
Kavraki, L.E., et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.
Murray, Sean, et al., "Robot Motion Planning on a Chip", Robotics: Science and Systems 2016; Jun. 22, 2016; 9 pages.
Murray, Sean, et al., "The microarchitecture of a real-time robot motion planning accelerator", 2016 49th Annual IEEE/ACM International Symposium on Microarchitecture (MICRO), IEEE, Oct. 15, 2016, 12 pages.
Rodriguez, Carlos, et al., "Planning manipulation movements of a dual-arm system considering obstacle Yemoving", Robotics and Autonomous Systems, Elsevier Science Publishers, vol. 62, No. 12, pp. 1816-1826; Aug. 1, 2014.
Stilman, Mike, et al., "Manipulation Planning Among Moveable Obstacles", Proceedings of the IEEE Int. Conf. on Robotics and Automation, Apr. 2007.
Non-Final Office Action issued in U.S. Appl. No. 16/268,290, dated Jan. 27, 2021, 54 pages.
Non-Final Office Action Issued in U.S. Appl. No. 16/308,693, dated May 14, 2021, 16 pages.
Non-Final Office Action Issued in U.S. Appl. No. 16/268,290, dated Jun. 17, 2021, 35 pages.
Final Office Action dated Aug. 2, 2021 for U.S. Appl. No. 16/240,086 in 66 pages.
European Search Report dated Jul. 23, 2021, for European Application No. 19851097.6, 15 pages.
Taiwanese First Office Action—Application No. 106119452 dated Jun. 18, 2021, 25 pages.
Corrales, J.A., et al., Safe Human-robot interaction based on dynamic sphere-swept line bounding volumes, Robotic and Computer-Integrated Manufacturing 27 (2011) 177-185, 9 page.
Pobil, Angel P, et al., "A New Representation for Collision Avoidance and Detection", Proceedings of the 1992 IEEE, XP000300485, pp. 246-251.
Sato, Yuichi, et al., "Efficient Collision Detection using Fast Distance-Calculation Algorithms for Convex and Non-Convex Objects", Proceeding of the 1996 IEEE, XP-000750294, 8 pages.

(56) References Cited

OTHER PUBLICATIONS

Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.

Bharathi Akilan et al: "Feedr-ate optimization for smooth minimum-time trajectory generation with higher order constraints", The International Journal of Advanced Manufacturing Technology,vol. 82, No. 5, Jun. 28, 2015 (Jun. 28, 2015), pp. 1029-1040.

Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.

Extended EP Search Report dated Jul. 18, 2022 EP App No. 20832308.9-1205, 10 pages.

Extended EP Search Report dated Jul. 25, 2022 EP App No. 20857383.2-1205, 10 pages.

Sonja MacFarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.

Final Office Action dated Sep. 7, 2022, for U.S. Appl. No. 16/909,096, 54 pages.

Gasparetto A et al: "Experimental validation and comparative analysis of optimal time-jerk algorithms for trajectory planning", Robotics and Computer Integrated Manufacturing, Elsevier Science Publishers BV. , Barking, GB, vol. 28, No. 2, Aug. 5, 2011.

Gasparetto et al: "A new method for smooth trajectory planning of robot manipulators", Mechanism and Machine Theory, Pergamon, Amsterdam, NL, vol. 42, No. 4, Jan. 26, 2007.

Haschke R et al: "On-Line Planning of Time-Opti.mal, Jerk-Limited Trajectories", Internet Citation, Jul. 1, 2008 (Jul. 1, 2008), pp. 1-6, XP00278977 6.

Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.

Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.

Non Final Office Action for U.S. Appl. No. 16/883,376, dated Sep. 27, 2022, 26 pages,.

S. Sarvana Perumaal et al: "Automated Trajectory Planner of Industrial Robot for Pick- and Place Task", International Journal of Advanced Robotic Systems, vol. 10, No. 2, Jan. 1, 2013.

Hassan, "Modeling and Stochastic Optimization of Complete Coverage under Uncertainties in Multi-Robot Base Placements," 2016, Intelligent Robots and Systems (IROS} (Year: 2016).

Hassan, et al., "An Approach to Base Placement for Effective Collaboration of Multiple Autonomous Industrial Robots," 2015 IEEE International Conference on Robotics and Automation (ICRA}, pp. 3286-3291 (Year: 2015).

Hassan, et al., "Simultaneous area partitioning and allocation for complete coverage by multiple autonomous industrial robots," 2017, Autonomous Robots 41, pp. 1609-1628 (Year: 2017).

Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189.

Kalawoun, "Motion planning of multi-robot system for airplane stripping," 2019, Universite Clermont Auvergne (Year: 2019).

Kapanoglu, et al., "A pattern-based genetic algorithm for multi-robot coverage path planning minimizing completion time," 2012, Journal of Intelligent Manufacturing 23, pp. 1035-1045 (Year: 2012).

Notice of Allowance for U.S. Appl. No. 17/153,662, dated Dec. 6, 2022, 15 pages.

Pires, et al., "Robot Trajectory Planning Using Multi-objective Genetic Algorithm Optimization," 2004, Genetic and Evolutionary Computation—GECCO 2004, pp. 615-626 (Year: 2004).

Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.

Extended EP Search Report dated Nov. 7, 2022, EP App No. 21744840.6-1205, 14 pages.

Klampfl Erica et al: "Optimization of workcell layouts in a mixed-model assembly line environment", International Journal of Flexible Manufacturing Systems, Kluwer Academic Publishers, Boston, vol. 17, No. 4, 23 pages, Oct. 10, 2006.

Long Tao et al: "Optimization on multi-robot workcell layout in vertical plane", Information and Automation (ICIA), 2011 IEEE International Conference on, IEEE, Jun. 6, 2011, 6 pages.

Pashkevich AP et al: "Multiobjective optimisation of robot location in a workcell using genetic algorithms", Control '98. UKACC International Conference on (Conf. Publ. No. 455) Swansea, UK Sep. 1-4, 1998, London, UK, vol. 1, Sep. 1, 1998, 6 pages.

Zhen Yang et al: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.

* cited by examiner

MOTION PLANNING FOR ROBOTS TO OPTIMIZE VELOCITY WHILE MAINTAINING LIMITS ON ACCELERATION AND JERK

TECHNICAL FIELD

The present disclosure generally relates to motion planning useful for robotics, and in particular to systems and methods that can enhance computational efficiency in optimizing velocity of a robot or portion thereof while maintaining limits on acceleration and jerk.

BACKGROUND

Description of the Related Art

Motion planning is a fundamental problem in robot control and robotics. A motion plan specifies a path that a robot can follow from a starting state to a goal state, typically to complete a task without colliding with any obstacles in an operational environment or with a reduced possibility of colliding with any obstacles in the operational environment. Challenges to motion planning involve the ability to perform motion planning at very fast speeds even as characteristics of the environment change. For example, characteristics such as location or orientation of one or more obstacles in the environment may change over time. Challenges further include performing motion planning using relatively low cost equipment, at relative low energy consumption, and with limited amounts of storage (e.g., memory circuits, for instance on processor chip circuitry).

BRIEF SUMMARY

It is typical for a robot or portion thereof to move along a path or trajectory, from a start pose or configuration to an end pose or configuration with one or more intermediary poses or configurations therebetween. One problem in robotics is maximizing a velocity of the robot or portion thereof along the path, while maintaining limits on acceleration and minimizing any jerking of the robot or portion thereof resulting from the motion. Such can be posed as an optimization problem, that is to optimize velocity along a geometric path without violating any constraints. The constraints in this context include constraints on velocity, acceleration, and jerk (i.e., the derivative of acceleration with respect to time).

Optimizing velocity while observing a limit on jerking (i.e., a jerk limit) is typically a computationally difficult problem. Conventional approaches employ non-linear optimization methods. These non-linear optimization methods are typically slow to solve, and are prone to getting stuck in non-optimal local minima, resulting in faulty solutions.

Faster, less computational intense, and more robust techniques to optimize velocity of robots or portions thereof without violating constraints on acceleration and jerk are commercially desirable.

Aspect 1. A method of operation in a processor-based system to control motion of a robot, the processor-based system including at least one processor, the method comprising:

for each of a plurality of waypoints $s_i$ from $s_1$ to at least $s_{n-1}$ along a geometric path, there being a corresponding robot configuration $q_i$ for each waypoint $s_i$, linearly determining an estimate of a maximized velocity along the path while applying an acceleration limit to movement represented by the transitions between adjacent ones of the waypoints $s_i$;

following the linearly determining the estimate of the maximized velocity along the path while applying the acceleration limit to movement represented by the transitions between adjacent ones of the waypoints $s_i$, for each of the plurality of waypoints $s_i$ from $s_1$ to at least $s_{n-1}$ along the geometric path, linearly determining an estimate of a maximized velocity along the path while applying a jerk limit to movement represented by the transitions between adjacent ones of the waypoints $s_i$; and for each of the waypoints $s_i$ from at least $s_2$ to $s_n$ along the geometric path, determining a respective time at which the respective waypoint is to be reached based on respective ones of the determined estimates of the maximized velocity.

Aspect 2. The method of aspect 1 wherein linearly determining an estimate of a maximized velocity along the path while applying an acceleration limit to movement represented by the transitions between adjacent ones of the waypoints $S_i$ comprises:

for waypoints $s_i$ successively from at least $s_{n-1}$ through $s_1$ (backwards), determining a respective range of feasible velocities bound by the acceleration limit at each respective waypoint $s_i$; and after determining a respective range of feasible velocities bound by the acceleration limit at each respective waypoint $S_i$, then for waypoints $s_i$ successively from $s_1$ through $s_{n-1}$ (forwards), selecting a respective value of acceleration that at least approximately maximizes an absolute value of velocity or a velocity squared for each transition between successive waypoints $s_i$ from $s_1$ through at least $s_{n-1}$ such that the respective value of acceleration is within the corresponding acceleration limit and the corresponding velocity is in the respective range of feasible velocities.

Aspect 3. The method of aspect 2 wherein for the waypoints $S_i$ successively from at least $s_{n-1}$ through $s_1$ (backwards), determining a respective range of feasible velocities bound by the acceleration limit at each respective waypoint $s_i$ comprises: determining a velocity at the waypoint $s_n$ that equals zero.

Aspect 4. The method of any of aspects 1 through 3 wherein linearly determining an estimate of a maximized velocity along the path while applying a jerk limit to movement represented by the transitions between adjacent ones of the waypoints $s_i$ comprises:

for waypoints $s_i$, successively from $s_{n-1}$ through $s_1$ (backwards), determining a respective range of feasible velocities and a respective range of feasible accelerations, each range bound by the jerk limit at each respective waypoint $s_i$; and after determining a respective range of feasible velocities and a range of feasible accelerations bound by the jerk limit at each respective waypoint $s_i$, then for waypoints $s_i$ successively from $s_1$ through $s_{n-1}$ (forwards), selecting a respective value of jerk that at least approximately maximizes a velocity squared (x) for each transition between successive waypoints $s_i$ from $s_1$ through $s_n$ such that the respective value of jerk is within the corresponding jerk limit, the corresponding velocity is in the respective range of feasible velocities, and the corresponding acceleration is in the respective range of feasible accelerations.

Aspect 5. The method of aspect 4, further comprising:
for a number of iterations until an end condition is reached,
for waypoints $s_i$, determining a respective jerk limited velocity based at least in part on a respective input value, the respective input value being equal to the respective input value of a most immediately previous iteration minus an epsilon value, and the epsilon value is either a constant that is held constant across the number of iterations or a variable that varies across the number of iterations.

Aspect 6. The method of aspect 5, further comprising: determining whether the end condition is reached, by:
determining a difference between the at least approximately maximized velocity squared corresponding to a current selected jerk value and the at least approximately maximized velocity squared corresponding to a most recent previously selected jerk value; and
comparing the determined difference to a threshold value.

Aspect 7. The method of aspect 1 wherein for each of the plurality of waypoints $s_i$ from $s_1$ to $s_n$ along the geometric path, determining a respective time at which the respective waypoint is to be reached based on respective ones of maximized velocities includes determining a time vector that represents a respective relative time at which each of the configurations $q_i$ is to be achieved.

Aspect 8. The method of aspect 7, further comprising: receiving a configuration vector of n robot configurations $q_i$, the configuration vector having a length n, and wherein determining a time vector that represents a respective relative time at which each of the configurations $q_i$ is to be achieved includes determining a time vector having a length that is equal to the length of the configuration vector.

Aspect 9. The method of aspect 8 wherein receiving a configuration vector of n robot configurations $q_i$ includes receiving a configuration vector that provides a vector of points in a configuration space of the robot, each point specifying a respective pose of each of at least two joints of the robot.

Aspect 10. The method of aspect 1 wherein determining a respective time at which the respective waypoint is to be reached based on respective ones of the determined estimates of maximized velocity, for each of the waypoints $s_i$ from at least $s_2$ to $s_n$ along the geometric path, includes determining a respective relative time at which the respective waypoint is to be reached, the respective relative time relative with respect to a respective time at which at least one preceding waypoint is to be reached.

Aspect 11. The method of any of aspects 1 through 3 or 6 through 10, further comprising: providing at least the determined respective times at which the respective waypoints are to be reached to control motion of the robot.

Aspect 12. A system to control motion of a robot, the system comprising:
at least one processor; and
at least one nontransitory processor-readable medium communicatively coupled to the at least one processor and which stores processor-executable instructions which, when executed by the at least one processor, cause the at least one processor to:
for each of a plurality of waypoints $s_i$ from $s_1$ to at least $s_{n-1}$ along a geometric path, there being a corresponding robot configuration $q_i$ for each waypoint $S_i$, linearly determine an estimate of a maximized velocity along the path under an acceleration limit applied to movement represented by the transitions between adjacent ones of the waypoints $s_i$;
following the linear determination of the estimate of a maximized velocity along the path under the acceleration limit applied to movement represented by the transitions between adjacent ones of the waypoints $s_i$, for each of the plurality of waypoints $s_i$ from $s_1$ to at least $s_{n-1}$ along the geometric path, linearly determine an estimate of a maximized velocity along the path under a jerk limit applied to movement represented by the transitions between adjacent ones of the waypoints $s_i$; and
for each of the waypoints $s_i$ from at least $s_2$ to $s_n$ along the geometric path, determine a respective time at which the respective waypoint is to be reached based on respective ones of the determined estimates of a maximized velocity.

Aspect 13. The system of aspect 12 wherein to linearly determine an estimate of a maximized velocity along the path under an acceleration limit applied to movement represented by the transitions between adjacent ones of the waypoints $s_i$ the processor-executable instructions cause the at least one processor to:
for waypoints $s_i$ successively from at least $s_{n-1}$ through $s_1$ (backwards), determine a respective range of feasible velocities bound by the acceleration limit at each respective waypoint $s_i$; and
after the determination of a respective range of feasible velocities bound by the acceleration limit at each respective waypoint $s_i$, then for waypoints $s_i$, successively from $s_1$ through $s_{n-1}$ (forwards), select a respective value of acceleration that at least approximately maximizes a velocity squared (x) for each transition between successive waypoints $s_i$ from $s_1$ through $s_n$ such that the respective value of acceleration is within the corresponding acceleration limit and the corresponding velocity is in the respective range of feasible velocities.

Aspect 14. The system of any of aspects 12 or 13 wherein to linearly determine an estimate of a maximized velocity along the path under a jerk limit applied to movement represented by the transitions between adjacent ones of the waypoints $s_i$ the processor-executable instructions cause the at least one processor to:
for waypoints $s_i$, successively from $s_{n-1}$ through $s_1$ (backwards), determine a respective range of feasible velocities and a respective range of feasible accelerations, each of the ranges bound by the jerk limit at each respective waypoint $s_i$; and
after the determination of a respective range of feasible velocities and a range of feasible accelerations bound by the jerk limit at each respective waypoint $s_i$, then for waypoints $s_i$ successively from $s_1$ through $s_{n-1}$ (forwards), select a respective value of jerk that at least approximately maximizes a velocity squared (x) for each transition between successive waypoints $s_i$ from $s_1$ through $s_n$ such that the respective value of jerk is within the corresponding jerk limit, the corresponding velocity is in the respective range of feasible velocities, and the corresponding acceleration is in the respective range of feasible accelerations.

Aspect 15. The system of aspect 14 wherein the processor-executable instructions, when executed, cause the at least one processor to further:
for a number of iterations until an end condition is reached,
for waypoints $s_i$, determine a respective jerk limited velocity based at least in part on a respective input value, the respective input value being equal to the respective input value of a most immediately previous iteration minus an epsilon value, and the epsilon value is either a constant that is held constant across the number of iterations or a variable that varies across the number of iterations.

Aspect 16. The method of aspect 15, further comprising: determining whether the end condition is reached, by:
determining a difference between the at least approximately maximized velocity squared corresponding to a current selected jerk value and the at least approximately maximized velocity squared corresponding to a most recent previously selected jerk value; and comparing the determined difference to a threshold value.

Aspect 17. The system of aspect 12 wherein to determine a respective time at which the respective waypoint is to be reached based on respective ones of maximized velocities the processor-executable instructions cause the at least one processor to determine a time vector that represents a respective relative time at which each of the configurations $q_i$ is to be achieved.

Aspect 18. The system of aspect 17 wherein the at least one processor receives a configuration vector of n robot configurations $q_i$, the configuration vector having a length n, and wherein to determine a time vector that represents a respective relative time at which each of the configurations $q_i$ is to be achieved the processor-executable instructions cause the at least one processor to determine a time vector having a length that is equal to the length of the configuration vector.

Aspect 19. The system of aspect 12 wherein to determine a respective time at which the respective waypoint is to be reached based on respective ones of the determined estimates of maximized velocity, the processor-executable instructions cause the at least one processor to, for each of the waypoints $s_i$ from at least $s_2$ to $s_n$ along the geometric path, determine a respective relative time at which the respective waypoint is to be reached, the respective relative time relative with respect to a respective time at which at least one preceding waypoint is to be reached.

Aspect 20. The system of aspect 12 wherein, when executed by the at least one processor, the processor-executable instructions cause the at least one processor to further:

provide at least the robot configurations for the respective waypoints and the corresponding determined respective times at which the respective waypoints are to be reached to control motion of the robot.

Aspect 21. A method of operation in a processor-based system to control motion of a robot, the processor-based system including at least one processor, the method comprising:

determining a range of feasible acceleration limited velocities for robotic movements represented by transitions between adjacent ones of a plurality of waypoints along a geometric path under an acceleration limit, there being a corresponding robot configuration for each waypoint;

for at least some of the waypoints, selecting an at least approximately maximized feasible acceleration limited velocity from the range of feasible acceleration limited velocities;

determining a range of feasible jerk limited velocities for robotic movements represented by transitions between adjacent ones of a plurality of waypoints along the geometric path under at least an approximate-jerk limit;

for at least some of the waypoints, selecting an at least approximately maximized feasible jerk limited velocity from the range of feasible jerk limited velocities; and for each of at least some of the waypoints, determining a respective time at which the respective waypoint is to be reached based on respective ones of the selected at least approximately maximized jerk limited velocities.

Aspect 22. The method of aspect 21, further comprising:

until an end condition is reached, repeatedly:

determining a new range of feasible jerk limited velocities for robotic movements represented by transitions between adjacent ones of a plurality of waypoints along the geometric path under at least an approximate-jerk limit; and for at least some of the waypoints, selecting an at least approximately maximized feasible jerk limited velocity from the new range of feasible jerk limited velocities.

Aspect 23. The method of aspect 22, further comprising:

determining with the end condition is reached by at least one of: determining whether a difference between successive selections of the at least approximately maximized feasible jerk limited velocity is at or below a threshold value or determining whether a defined number of iterations has been reached.

Aspect 24. The method of aspect 21 wherein determining a range of feasible acceleration limited velocities for robotic movements represented by transitions between adjacent ones of a plurality of waypoints along a geometric path under an acceleration limit comprises:

for each of the waypoints $S_i$ successively from at least $s_{n-1}$ through $s_1$ (backwards), determining a respective range of feasible acceleration limited velocities obtainable under an acceleration limit at each respective waypoint $s_i$; and selecting an at least approximately maximized feasible acceleration limited velocity from the range of feasible acceleration limited velocities comprises: for waypoints $s_i$ successively from $s_1$ through $s_{n-1}$ (forwards), selecting a respective value of acceleration that at least approximately maximizes a velocity squared (x) for each transition between successive waypoints $s_i$ from $s_1$ through $s_n$.

Aspect 25. The method of aspect 21 wherein determining a range of feasible jerk limited velocities for robotic movements represented by transitions between adjacent ones of a plurality of waypoints along the geometric path under at least an approximate-jerk limit comprises:

for waypoints $s_i$, successively from $s_{n-1}$ through $s_1$ (backwards), determining a respective range of feasible velocities and a respective range of feasible accelerations obtainable under a jerk limit and under an acceleration limit at each respective waypoint $s_i$; and for each of at least some of the waypoints, determining a respective time at which the respective waypoint is to be reached based on respective ones of the selected at least approximately maximized jerk limited velocities comprises: for waypoints $s_i$ successively from $s_1$ through $s_{n-1}$ (forwards), selecting a respective value of jerk that at least approximately maximizes a velocity squared (x) for each transition between successive waypoints $s_i$ from $s_1$ through $s_n$.

Aspect 26. The method of aspect 25 wherein determining a range of feasible jerk limited velocities for robotic movements represented by transitions between adjacent ones of a plurality of waypoints along the geometric path under at least an approximate-jerk limit includes, for a number of iterations until an end condition is reached, for waypoints $s_i$, determining a respective jerk limited velocity based at least in part on a respective input value, the respective input value being equal to the respective input value of a most immediately previous iteration minus an epsilon value, and the epsilon value is either a constant that is held constant across the number of iterations or a variable that varies across the number of iterations.

Aspect 27. The method of any of aspects 21 through 26, further comprising: providing at least the determined times at which the respective waypoints are to be reached to control motion of the robot.

Aspect 28. A system to control motion of a robot, the system comprising:

at least one processor; and at least one nontransitory processor-readable medium communicatively coupled to the at least one processor and which stores processor-executable instructions which, when executed by the at least one processor cause the at least one processor to execute any of the methods of any of aspects 1 through 10 or 21 through 26.

Aspect 29. The system of aspect 28 wherein, when executed by the at least one processor, the processor-executable instructions cause the at least one processor to further:

provide at least the robot configurations for the respective waypoints and corresponding determined respective times at which the respective waypoints are to be reached to control motion of the robot.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
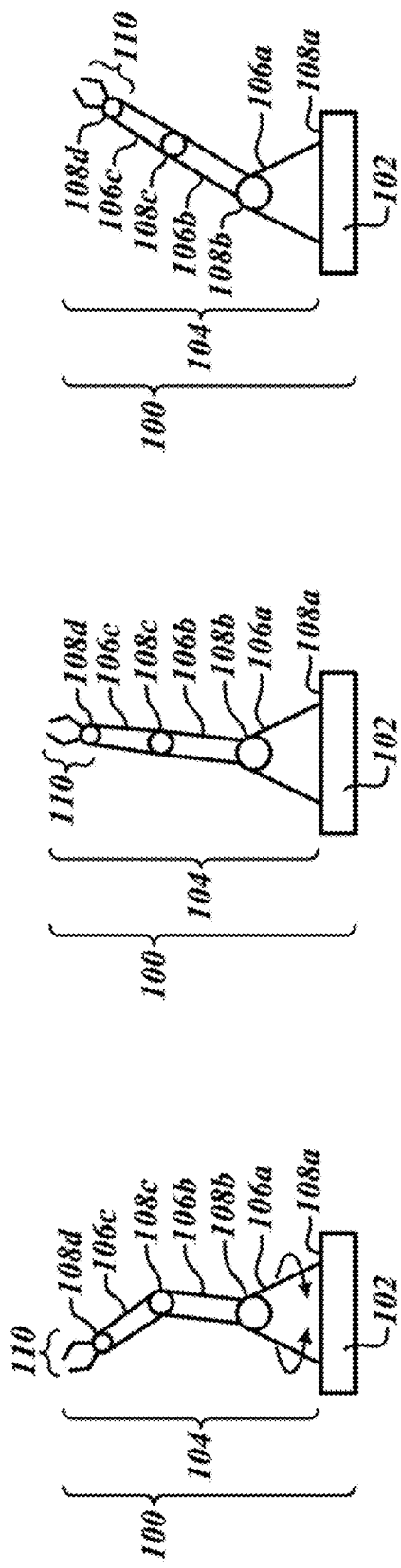
FIGS. 1A, 1B, 1C, 1D and 1E are schematic diagrams of a robot with a movable robotic appendage comprising a number of links and joints, illustrated respectively at a plurality of sequential poses along a geometric path, according to one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, robots, robotic appendages, actuator systems, and/or communications networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the embodiment is included in at least one implementation or in at least one embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As previously noted, an important problem in robotics is called "jerk minimization" which may be implemented by determining velocities between various configurations while maintaining limits on acceleration and on jerk (i.e., the derivative of acceleration with respect to time).

A given geometric path or trajectory that a robot or robotic appendage is to follow may, for instance be specified as a configuration vector, that is a vector of points in a configuration or C-space of the robot (e.g., $\{1^{st}$ posn of joints, $2^{nd}$ posn of joints, . . . , nth posn of joints$\}$. For each geometric path, a time vector is generated with times at which the robot or portion thereof reaches those respective configurations or "positions" (e.g., $\{t_1, t_2, \ldots, t_n\}$) The time vector may have a same length as the configuration vector. A performance optimization problem is presented, that is to go as fast as possible along the geometric path without violating any constraints (e.g. constraints on velocity, acceleration, and jerk (the derivative of acceleration).

Optimizing speed while observing the jerk limit is computationally difficult. Conventional approaches typically employ non-linear optimization methods that are slow and can get stuck in non-optimal local minima. The approach described herein makes optimization with respect to jerk a quasi-convex optimization problem, significantly reducing the computational complexity. A linear optimization approach to optimize speed along a geometric path while staying within an acceleration limit is described herein, first in terms of theoretical basis for simplifying the problem, then in terms of practical implementation.

The geometric path or trajectory has some number of "waypoints" (positions on the path) between a start and an end. Waypoints are denoted as $s_i$, as in $\{s_1, s_2, \ldots, s_n\}$. The goal is to find the times (e.g., vector of times or time vector) that correspond to those waypoints $\{t_1, t_2, \ldots, t_n\}$. A configuration of the joints is denoted $q_i$, as in the robot is in a configuration $q_i$ at waypoint $s_i$. Velocity is denoted as v, acceleration denoted as a, and jerk is the derivative of acceleration with respect to time (da/dt).

Two types of derivatives are used. Derivatives with respect to time (e.g., dZ/dt) are denoted with a dot or multiple dots) on top the variable (e.g., Ż). Derivatives with respect to position on the geometric path (e.g., dZ/ds) are denoted with a prime or multiple primes (e.g., Z').

Start with Equation 1 below, where the derivative dq/ds=q' is a change in a configuration as a position on a geometric path changes, and the derivative ds/dt=ṡ is velocity.

$$\frac{dq}{ds} \times \frac{ds}{dt} = q'\dot{s} = \dot{q} \qquad \text{Equation 1}$$

Next, take the derivative of q̇ with respect to s in Equation 1, to get:

$$\ddot{q} = \frac{dq'}{ds} \times \frac{ds}{dt} = \ddot{s}q' + q''\dot{s}^2 \quad \text{Equation 2}$$

Substituting a=s̈, and x=ṡ² into Equation 2, leaves $$\ddot{q} = aq' + q''x \quad \text{Equation 3}$$

The optimization goal is to maximize an absolute value of velocity, or more conveniently velocity squared (x)), under the following three constraints:

$$xq'^2 < v\_limit^2 \quad \text{Constraint 1)}$$

$$aq' + q''x < a\_limit \quad \text{Constraint 2)}$$

$$x_{i+1} = x_i + 2\Delta a_i \quad \text{Constraint 3)}$$

The technique advantageously takes advantage of transforming this non-linear optimization problem into a linear optimization problem. To do so, it is assumed that at the end of the geometric path the velocity (ṡ) and acceleration (a) will each equal zero. Velocity is zero once the end of the geometric path is reached, and acceleration can arbitrarily be ensured to also be zero. This means that at an end waypoint $s_n$, v=a=0.

In implementation, to solve for an estimated maximum velocity while maintaining a limit on acceleration, first a range of feasible velocities at each waypoint can be found, subject to a bound on acceleration (a) or subject to an acceleration limit. This can be accomplished working backwards along the geometric path or trajectory, determining the feasible range at each waypoint along the geometric path successively from at least $s_{n-1}$ to $s_1$. The range of feasible velocities may be continuous or may be discrete. Notably, at a waypoint $s_{n-1}$ (the waypoint just proceeding the final waypoint $s_n$), the acceleration (a) will be something between zero and a small negative number as the robot or portion thereof decelerates towards the final waypoint $s_n$. Since it is known that acceleration (a) is a small negative number, the velocity (v) can be bounded. Now, working forwards along the geometric path or trajectory successively from $s_1$ to $s_{n-1}$, a value of (a) is selected at each waypoint $s_i$ that allows an absolute value of velocity or more conveniently velocity squared (x) to be at least approximately maximized such that the respective value of acceleration is within the corresponding acceleration limit and the corresponding velocity is in the respective range of feasible velocities.

The approach described above is a linear approach for at least approximately maximizing or optimizing velocity while staying under an acceleration limit. The correct choice of variables makes the problem linear. In the acceleration limited case, the constraints and the objective function are intentionally constructed from decision variables that make the problem linear. A linear solver can be employed to solve the problem.

A linear approach is now described for at least approximately maximizing or optimizing velocity while not exceeding a constraint on jerk.

Start with Equation 4 below $$\text{jerk} = \dddot{q} = \quad \text{Equation 4}$$

$$\dot{s}^3 q''' + 3\dot{s}\ddot{s}q'' + \dddot{s}q' = \dot{s}\left(\dot{s}^2 q''' + 3\ddot{s}q'' + \frac{\dddot{s}q'}{\dot{s}}\right) \leq \text{jerk\_limit}$$

Substituting: x=ṡ², a=s̈, $$j = \frac{\dddot{s}}{\dot{s}},$$

leaves:

$$\text{jerk} = \dot{s}(xq''' + 3aq'' + jq') \quad \text{Equation 5}$$

Notably, an estimate of a maximized velocity=ṡ has already been solved for as described above, by optimizing velocity while staying within the acceleration limit. Due to the linearization of the problem of solving for velocity while staying with the acceleration limit, the resulting estimated velocity is not bounded by jerk or jerk limited, but advantageously serves as a good starting point for optimizing velocity while staying within the jerk limit. Notably, there is a different value of ṡ (velocity) at each waypoint $s_i$. The previously determined value of ṡ at the acceleration limit (denoted as $\dot{s}_{a\_limit}$) can advantageously be used for the linearized problem of solving for velocity while staying with the jerk limit, as described below.

A value denoted as "approximated-jerk" is defined as the jerk equation with velocity ṡ replaced by the previously determined value of ṡ at the acceleration limit, that is $\dot{s}_{a\_limit}$. This approximation helps, even though it means that the optimization might not be as optimal as if optimizing for a "true" jerk limit. The equation for approximated-jerk, including the substitutions mentioned above is given as:

$$\text{approximated\_jerk} = \dot{s}_{a\_limit}(xq''' + 3aq'' + jq') \leq \text{jerk\_limit} \quad \text{Equation 6}$$

Now we optimize by maximizing an absolute value of velocity, or more conveniently velocity squared (i.e., x+2Δa+Δ²j) under three new constraints, as well as constraints 1 and 2 above:

$$xq'^2 < v_{limit}^2 \quad \text{Constraint 1)}$$

$$aq' + q''x < a\_limit \quad \text{Constraint 2)}$$

$$\text{approximated\_jerk} = \dot{s}_{a\_limit}(xq''' + 3aq'' + jq') \leq \text{jerk\_limit} \quad \text{Constraint 3)}$$

$$x_{i+1} = x_i + 2\Delta a_i + \Delta^2 j \quad \text{Constraint 4)}$$

$$a_{i+1} = a_i + \Delta j_i \quad \text{Constraint 5)}$$

The goal is to transform a non-linear optimization problem into a linear one. The choice of the three decision variables (x=ṡ², a=s̈, and $$j = \frac{\dddot{s}}{\dot{s}})$$

almost makes the approximated jerk limit equation linear with respect to the decision variables, except that there is an additional ṡ. In this case, the additional ṡ is held constant by substituting in a previously determined value of ṡ at the acceleration limit (denoted as $\dot{s}_{a\_limit}$). This linearizes the problem of solving for velocity while staying with the jerk limit, at the cost of optimality.

The sub-optimality of the problem is directly related to how poor of an approximation $\dot{s}_{a_{limit}}$ is of $\dot{s}$. Notably, the jerk limit is a special form of nonlinearity, known as quasi-convex. This form of non-convexity can easily be handled by a binary search for the value $\dot{s}$. This provides two options, depending on whether optimality or planner speed is preferred. In the case where optimality is paramount, for the cost of three (3) or four (4) additional iterations of the linear solver, the solution can get within 5-7% of the optimal solution. The determined solution could be made arbitrarily close to the optimal solution by increasing the accuracy of the $\dot{s}$ estimate. In the case where planner speed is of utmost importance, the approximated-jerk solution can be used directly, without successive iterations or refinements.

In implementation, to solve for an estimated maximum velocity while maintaining a limit on jerk, first a range of feasible velocities and a range of feasible accelerations can be found, subject to a bound on jerk or subject to a jerk limit. This can be accomplished working backwards along the geometric path or trajectory, determining the feasible ranges at each waypoint along the geometric path successively from at least $s_{n-1}$ to $s_1$. The range of feasible velocities and/or the range of feasible accelerations may be continuous or may be discrete. Now, working forwards along the geometric path or trajectory successively from $s_1$ to $s_{n-1}$, a value of jerk is selected at each waypoint $s_i$ that allows an absolute value of velocity or more conveniently velocity squared (x) to be at least approximately maximized or optimized such that the respective value of jerk is within the corresponding jerk limit, the corresponding velocity is in the respective range of feasible velocities, and the corresponding acceleration is in the respective range of feasible accelerations.

FIGS. 1A, 1B, 1C, 1D and 1E show a robot 100 with a base 102 and a movable robotic appendage 104, illustrated respectively at a plurality of sequential configurations or poses along a geometric path or trajectory that the robot or a portion thereof follows, according to one illustrated implementation. In particular, FIGS. 1A-1E shows the robotic appendage 104 at a series of sequential configurations or poses, moving from a first or initial configuration or pose (FIG. 1A) to a final or end configuration or pose (FIG. 1E), with a number of intermediary configurations or poses (FIGS. 1B-1D) along the geometric path or trajectory. The robot 100 is operable to carry out tasks, during which the robot or robotic appendage 104 may traverse one or more geometric paths or trajectories.

The base 102 of the robot 100 may, for example be fixed to a floor or other support, or alternatively may include wheels or treads. As illustrated, the robotic appendage 104 may be comprised a number of links 106a, 106b, 106c (three shown, collectively 106), joints 108a, 108b, 108c, 108d (four shown, collectively 108), and optionally an end of arm tool or end effector 110. A first joint 108a may rotatably couple a first link 106a to the base 102, for rotation around a central axis of the base. A second joint 108b may rotatably couple a second link 106b to the first link 106a for rotation about a corresponding axis of rotation. A third joint 108c may rotatably couple a third link 106c to the second link 106b for rotation about a corresponding axis of rotation. A fourth joint 108d may rotatably couple the end of arm tool or end effector 110 to the third link 106c for rotation about a corresponding axis of rotation. While not visible in FIGS. 1A-1E, the robot 100 typically includes one or more actuators and optionally transmissions, coupled to move the links with respect to the base and/or one another.

Each configuration or pose of the robot 100 or robotic appendage 104 may be defined by a respective set of configurations or poses of the collection of the joints 108a-108d, for example represented in the configuration space (C-space) of the robot 100. It is noted that the "configuration space" or "C-space" of the robot 100 is different than a workspace (i.e., two- or three-dimensional environment) in which the robot 100 operates. The workspace may include one or more work items or work pieces (not illustrated) which the robot 100 manipulates as part of performing tasks, for example one or more parcels, packaging, fasteners, tools, items or other objects. A geometric path or trajectory may be represented as a sequence of configurations or poses of the robot 100 or robotic appendage 104, each configuration or pose in the sequence represented as a respective set of a plurality of configurations or poses of the collection of the joints 108a-108d. The collection of configurations or poses of the robot 100 or robotic appendage 104 may be provided, received, or represented as a configuration vector.

Figure 2:
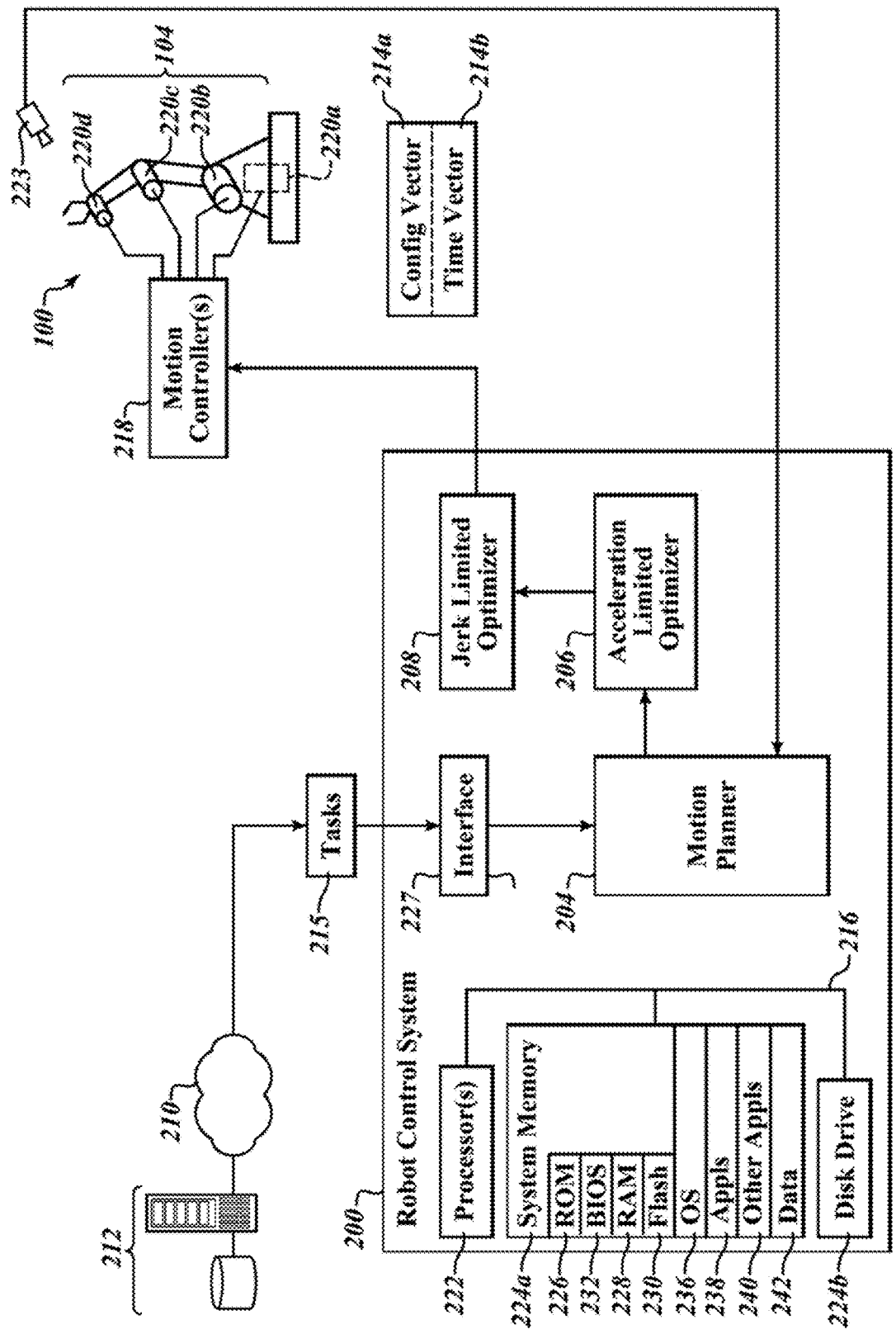
FIG. 2 is a functional block diagram of an environment in which a robot is controlled via a robot control system that includes a motion planner and optimizers that at least approximately optimize a velocity of the robot or portion thereof while maintaining limits on acceleration and jerk in a computational efficient manner, according to one illustrated implementation.

FIG. 2 shows an environment in which a robot control system 200 is communicatively coupled to control the motion of a robot 100 or portion thereof (e.g., robotic appendage 104), according to one illustrated implementation.

The robot control system 200 includes a motion planner 204, that generates motion plans which specify geometric paths or trajectories, and also includes an acceleration limited optimizer or solver 206 and a jerk limited optimizer or solver 208 which are operable to computationally efficiently determine at least approximately optimal trajectories (e.g., robot configurations and timing) to cause a robot 100 or robotic appendage 104 to move along a geometric path or trajectory at approximately optimal velocities while complying with limits on acceleration and jerk. The geometric path or trajectory may allow the robot 100 to perform one or more tasks 215.

The robot control system 200 is communicatively coupled to control operation of the robot 100 via at least one communications channel (indicated by proximate arrows, e.g., transmitter, receiver, transceiver, radio, router, Ethernet). The robot control system 200 may be communicatively coupled to one or more motion controllers 218 (e.g., motor controller), which provide drive signals to one or more actuators 220a, 220b, 220c, 220d of the robot 100. The motion controllers 218 may be part of the robot 100, or distinct therefrom.

The robot 100 can take any of a large variety of forms. Typically, the robots 100 will take the form of, or have, one or more robotic appendages 104. The robot 102 may include one or more linkages 106a, 106b, 106c (FIG. 1) with one or more joints (108a, 108b, 108c, 108d, 108e (FIG. 1), and actuators 220a, 220b, 220c, 220d (e.g., electric motors, stepper motors, solenoids, pneumatic actuators or hydraulic actuators) coupled and operable to move the linkages 106a, 106b, 106c in response to control or drive signals. Pneumatic actuators may, for example, include one or more pistons, cylinders, valves, reservoirs of gas, and/or pressure sources (e.g., compressor, blower). Hydraulic actuators may, for example, include one or more pistons, cylinders, valves, reservoirs of fluid (e.g., low compressibility hydraulic fluid), and/or pressure sources (e.g., compressor, blower). The robot 100 may employ or take the form of other forms of robots, for example autonomous vehicles.

The robot control system 200 may be communicatively coupled, for example via at least one communications channel (indicated by proximate arrows, e.g., transmitter, receiver, transceiver, radio, router, Ethernet), to optionally receive motion planning graphs (not shown) and/or swept volume representations (not shown) from one or more sources 212 of motion planning graphs and/or swept volume representations. The source(s) 212 of motion planning graphs and/or swept volumes may be separate and distinct from the motion planner according to one illustrated implementation. The source(s) 212 of motion planning graphs and/or swept volumes may, for example, be one or more processor-based computing systems (e.g., server computers), which may be operated or controlled by respective manufacturers of the robots 100 or by some other entity. The motion planning graphs may each include a set of nodes (not shown) which represent states, configurations or poses of the robot 100, and a set of edges (not shown) which couple nodes of respective pairs of nodes, and which represent legal or valid transitions between the states, configurations or poses. States, configurations or poses may, for example, represent sets of joint positions, orientations, poses, or coordinates for each of the joints of the respective robot 100. Thus, each node may represent a pose of a robot 100 or portion thereof as completely defined by the poses of the joints comprising the robot 100. The motion planning graphs may be determined, set up, or defined prior to a runtime (i.e., defined prior to performance of tasks), for example during a pre-runtime or configuration time. The swept volumes represent respective volumes that a robot 100 or portion thereof would occupy when executing a motion or transition that corresponds to a respective edge of the motion planning graph. The swept volumes may be represented in any of a variety of forms, for example as voxels, a Euclidean distance field, a hierarchy of geometric objects. This advantageously permits some of the most computationally intensive work to be performed before runtime, when responsiveness is not a particular concern.

The robot control system 200 may comprise one or more processor(s) 222, and one or more associated nontransitory computer- or processor-readable storage media for example system memory 224a, disk drives 224b, and/or memory or registers (not shown) of the processors 222. The nontransitory computer- or processor-readable storage media 224a, 224b are communicatively coupled to the processor(s) 222a via one or more communications channels, such as system bus 216. The system bus 216 can employ any known bus structures or architectures, including a memory bus with memory controller, a peripheral bus, and/or a local bus. One or more of such components may also, or instead, be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

As noted above, the robot control system 200 may optionally be communicably coupled to one or more remote computer systems, e.g., server computer (e.g. source of motion planning graphs 212), desktop computer, laptop computer, ultraportable computer, tablet computer, smartphone, wearable computer, that are directly communicably coupled or indirectly communicably coupled to the various components of the robot control system 200, for example via a network interface 227. Remote computing systems (e.g., server computer) may be used to program, configure, control or otherwise interface with or input data (e.g., motion planning graphs, swept volumes, task specifications 215) to the robot control system 200 and various components within the robot control system 200. Such a connection may be through one or more communications channels, for example, one or more wide area networks (WANs), for instance, Ethernet, or the Internet, using Internet protocols. As noted above, pre-runtime calculations (e.g., generation of the family of motion planning graphs) may be performed by a system that is separate from the robot control system 200 or robot 100, while runtime calculations may be performed by the processor(s) 222 of the robot control system 200, which in some implementations may be on-board the robot 100.

The robot control system 200 may optionally be communicably coupled to one or more sensors, for example one or more cameras 223, motion sensors, rotational encoders, accelerometer, etc.

As noted, the robot control system 200 may include one or more processor(s) 222, (i.e., circuitry), nontransitory storage media 224a, 224b, and system bus 216 that couples various system components. The processors 222 may be any logic processing unit, such as one or more central processing units (CPUs), digital signal processors (DSPs), graphics processing units (GPUs), field programmable gate arrays (FPGAs), application-specific integrated circuits (ASICs), programmable logic controllers (PLCs), etc. The system memory 224a may include read-only memory ("ROM") 226, random access memory ("RAM") 228 FLASH memory 230, EEPROM (not shown). A basic input/output system ("BIOS") 232, which can form part of the ROM 226, contains basic routines that help transfer information between elements within the robot control system 200, such as during start-up.

The drive 224b may be, for example, a hard disk drive for reading from and writing to a magnetic disk, a solid state (e.g., flash memory) drive for reading from and writing to solid state memory, and/or an optical disk drive for reading from and writing to removable optical disks. The robot control system 200a may also include any combination of such drives in various different embodiments. The drive 224b may communicate with the processor(s) 222 via the system bus 216. The drive(s) 224b may include interfaces or controllers (not shown) coupled between such drives and the system bus 216, as is known by those skilled in the relevant art. The drive 224b and its associated computer-readable media provide nonvolatile storage of computer- or processor readable and/or executable instructions, data structures, program modules and other data for the robot control system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Executable instructions and data can be stored in the system memory 224a, for example an operating system 236, one or more application programs 238, other programs or modules 240 and program data 242. Application programs 238 may include processor-executable instructions that cause the processor(s) 222 to perform one or more of: generating discretized representations of the environment in which the robot 100 will operate, including obstacles and/or target objects or work pieces in the environment where planned motions of other robots may be represented as obstacles; generating motion plans or road maps including calling for or otherwise obtaining results of a collision assessment, setting cost values for edges in a motion planning graph, and evaluating available paths in the motion planning graph; optionally storing the determined plurality of motion plans or road maps, and/or performing optimizations (e.g., linear optimizers). The motion plan construction (e.g., collision detection or assessment, updating costs of edges in motion planning graphs based on collision detection or assessment, and path search or evaluation) can be executed as described in the references incorporated herein by reference. The collision detection or assessment may perform collision detection or assessment using various structures and techniques described in the references incorporated herein by reference. Application programs 238 may additionally include one or more machine-readable and machine-executable instructions that cause the processor(s) 222 to perform other operations, for instance optionally handling perception data (captured via sensors) and/or optimizations. Application programs 238 may additionally include one or more machine-executable instructions that cause the processor(s) 222 to perform various other methods described herein and in the references incorporated herein by reference.

In various embodiments, one or more of the operations described above may be performed by one or more remote processing devices or computers, which are linked through a communications network (e.g., network 210) via network interface 227.

While shown in FIG. 2 as being stored in the system memory 224*a*, the operating system 236, application programs 238, other programs/modules 240, and program data 242 can be stored on other nontransitory computer- or processor-readable media, for example drive(s) 224*b*.

The structure and/or operation of the motion planner 204 of the robot control system 200 may be as illustrated and described in commonly assigned U.S. patent application 62/865,431, filed Jun. 24, 2019.

The processor(s) 222 and/or the motion planner 204 may be, or may include, any logic processing units, such as one or more central processing units (CPUs), digital signal processors (DSPs), graphics processing units (GPUs), application-specific integrated circuits (ASICs), field programmable gate arrays (FPGAs), programmable logic controllers (PLCs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. The construction and operation of the various structure shown in FIG. 2 may implement or employ structures, techniques and algorithms described in or similar to those described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. Patent Application No. 62/856,548, filed Jun. 3, 2019, entitled "APPARATUS, METHODS AND ARTICLES TO FACILITATE MOTION PLANNING IN ENVIRONMENTS HAVING DYNAMIC OBSTACLES"; and/or U.S. patent application 62/865,431, filed Jun. 24, 2019, entitled "MOTION PLANNING FOR MULTIPLE ROBOTS IN SHARED WORKSPACE".

Although not required, many of the implementations will be described in the general context of computer-executable instructions, such as program application modules, objects, or macros stored on computer- or processor-readable media and executed by one or more computer or processors that can perform obstacle representation, collision assessments, other motion planning operations, and optimizations.

The motion planner 204 may determine a geometric path or trajectory (e.g., optimal or optimized) that specifies a sequence of configurations of the robot 100 or robotic appendage 104, for example specified as a configuration vector in the c-space of the robot 100.

The acceleration limited optimizer or solver 206 determines an at least approximately optimized velocity for each transition between waypoints $s_i$ of the geometric path or trajectory while respecting an acceleration limit. As previously noted, converting the optimization problem into a linear form advantageously provides significant increases in computational efficiency and reduces or even eliminates occurrences of getting stuck in local minima. The determined velocity values may advantageously be provided to the jerk limited optimizer or solver 208.

The jerk limited optimizer or solver 208 determines an at least approximately optimized velocity for each transition between waypoints $s_i$ of the geometric path or trajectory while respecting a jerk limit. As previously noted, converting the optimization problem into a linear form advantageously provides significant increases in computational efficiency and reduces or even eliminates occurrences of getting stuck in local minima. The jerk limited optimizer or solver 208 may refine the determined velocity values to reach any defined level of optimization.

The processor-based system or a portion thereof may determine times corresponding to each waypoint $s_i$ at which the robot or portion thereof should be in the corresponding configuration or pose. The processor-based system or a portion thereof may provide the configurations (e.g., as configuration vector) 214*a* and times (e.g., as time vector) 214*b* to drive the robot or portion thereof to move along the geometric path or trajectory in an at least approximately optimized fashion.

Figure 3:
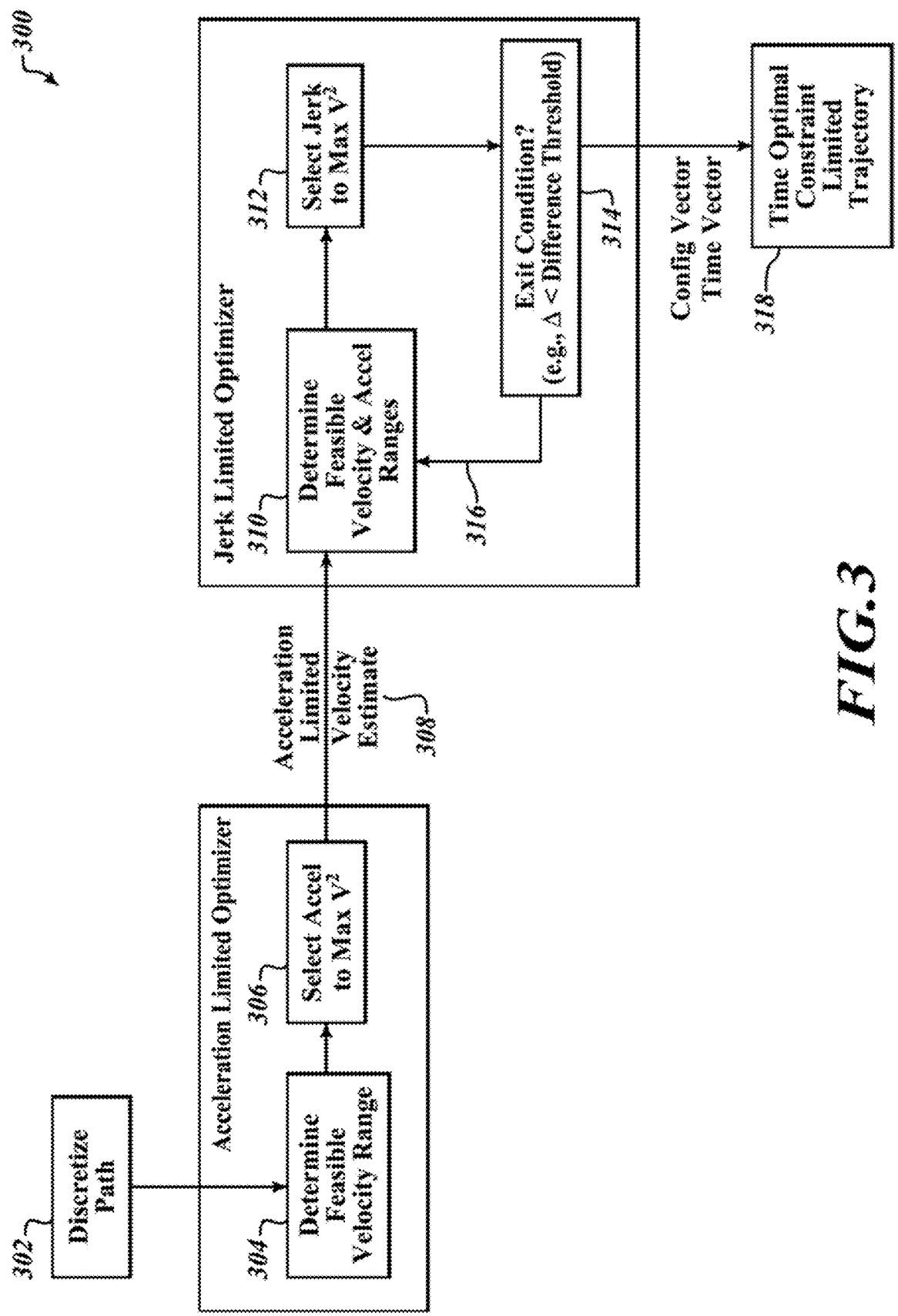
FIG. 3 is flow diagram illustrating a method of operation of the system of FIG. 2, according to one illustrated implementation.

FIG. 3 shows a method of operation 300 in a processor-based system to computationally efficiently generate at least approximately optimized trajectory information to control a robot or portion thereof, according to at least one illustrated implementation. The method 300 may, for example, be executed during a runtime. The method 300 may be executed by a processor-based system that is part of a robot and/or robot control system. Alternatively, the method 300 may be executed by a processor-based system (e.g., server computer) that is separate and distinct, and possibly remote, from the robot.

As an overview, initially an acceleration limited optimizer produces an initial optimized velocity estimate. That initial optimized velocity estimate is provided to the jerk limited optimizer as an initial estimate or seed for determining a jerk limited velocity estimate. That initial estimate of acceleration limited velocity is not limited by a constraint on jerk. If desired, the subsequently determined jerk limited velocity estimate may be employed after a single iteration. Alternatively, multiple iterations may be performed to refine the jerk limited velocity estimate; each iteration stepping closer to an optimal jerk limited velocity. The optimal value is, of course, not known until reached. In many practical applications an estimated or approximated optimal jerk limited velocity comes close to, but may in fact fall short of, a theoretically optimal value since precise accuracy is generally not required, and may be traded off for how much time the processing takes.

At 302, a processor-based system or portion thereof generates or receives a discretized geometric path for the robot or portion thereof to follow. The discretized geometric path may, for example, take the form of a configuration vector, specifying for each position or waypoint along the geometric path a respective set of joint positions or joint coordinates that place the robot or portion thereof in a corresponding configuration or pose. As illustrated, an acceleration limited optimizer or solver 206 (FIG. 2) may receive the configuration vector.

At 304, the processor-based system or portion thereof (e.g., acceleration limited optimizer or solver 206 (FIG. 2)) determines, for each of the waypoints, a range of feasible velocities based on an acceleration limit. Determination of the range of feasible velocities corresponds to the backward pass along the geometric path or trajectory that is performed as part of determining an optimized acceleration limited velocity, described above. The range of feasible velocities may be continuous, or alternatively may be a set of discrete velocities.

At 306, the processor-based system or portion thereof, for each of the waypoints along the geometric path or trajectory, selects an acceleration that maximizes velocity. The selection of the acceleration to maximize velocity corresponds to the forward pass along the geometric path or trajectory that is performed as part of determining an optimized acceleration limited velocity, described above. That is, for example, a value of acceleration may be selected that approximately maximizes a velocity squared such that the respective value of acceleration is within the corresponding acceleration limit and the corresponding velocity is in the respective range of feasible velocities.

At 308, the maximum feasible velocity values are provided to a jerk limited optimizer or solver 208 (FIG. 2). For example, an acceleration limited velocity solver passes the velocity estimate to an approximated-jerk limited subproblem solver, which uses the velocity estimate as a starting point. The velocity estimates are typically higher or faster than what the corresponding jerk limited velocity estimates will end up being.

At 310, the processor-based system or portion thereof (e.g., jerk limited optimizer or solver 208 (FIG. 2)) determines, for each waypoint, a range of feasible velocities and a range of feasible accelerations based on a jerk limit. Determination of the range of feasible velocities and the range of feasible accelerations corresponds to the backward pass along the geometric path or trajectory that is performed as part of determining an optimized jerk limited velocity, described above. The range of feasible velocities and/or the range of feasible accelerations may be continuous, or alternatively may be a set of discrete velocities or discrete accelerations.

At 312, the processor-based system or portion thereof selects a maximum feasible velocity for each of the waypoints along the geometric path from the range of feasible velocities. The selection of the maximum feasible velocity corresponds to the forward pass along the geometric path or trajectory that is performed as part of determining an optimized jerk limited velocity, described above. That is, for example, a value of jerk may be selected that approximately maximizes a velocity squared such that the respective value of jerk is within the corresponding jerk limit, the corresponding velocity is in the respective range of feasible velocities, and the corresponding acceleration is in the respective range of feasible accelerations.

At 314, the processor-based system determines whether an exit condition has been reached, for example as described below.

At 316, in response to a determination that the exit condition has not occurred, the processor-based system refines the velocity estimate, for example as described below. Once the exit condition has occurred for each waypoint, the processor-based system determines and outputs a time optimal constraint limited trajectory at 318. Thus, the velocity estimate may be refined through several iterations, as described below, until the exit condition occurs.

The exit condition evaluation at 314 may be a determination that an estimated jerk limited velocity is sufficient relative to a defined criteria, and/or may be the performance of a defined number of iterations of refining the jerk limited velocity estimate, e.g. converging to a suitable jerk limited velocity estimate. For example, to determine whether a jerk limited velocity estimate is sufficient, the processor-based system may determine a difference between a jerk limited velocity or velocity squared estimate for a current iteration and a jerk limited velocity or velocity square estimate for a most recent previous iteration. The processor-based system can then determine whether the difference is within a defined acceptable difference threshold. The difference threshold may be selected to reflect the fact that gradual improvements in the jerk limited velocity estimate will result in the difference becoming smaller with each iteration by the jerk limited optimizer. The specific difference threshold will be application specific, and will depend on balancing a desire for optimized jerk limited velocity of a robot or robotic appendage versus the speed of calculating the optimized jerk limited velocity. The number of iterations can be set to any desired integer value.

Stated differently, the processor-based system may, for example, iterate until an end condition is reached. During a first iteration, an acceleration limited velocity is employed as an input to the jerk limited optimization. The first iteration results in a first jerk limited velocity estimate. The first jerk limited velocity estimate is likely lower or slower than optimal, but can be used if, for example, processing time is considered more valuable than optimal velocity of the robot or portion thereof. If the exit condition is not satisfied, during a second iteration the input from the first iteration minus an epsilon value is used as the new input to the jerk limited optimization. The second iteration results in a second jerk limited velocity estimate. The second jerk limited velocity estimate may be lower or slower than optimal, but can be used if, for example, processing time is considered more valuable than optimal velocity of the robot or portion thereof. If the exit condition is not satisfied, during a third iteration the input from the most recent previous iteration (e.g., second iteration) minus an epsilon value is used as the new input to the jerk limited optimization. The third iteration results in a third jerk limited velocity estimate. The third jerk limited velocity estimate may be lower or slower than optimal, but can be used if, for example, processing time is considered more valuable than optimal velocity of the robot or portion thereof. In each iteration, the jerk limited velocity estimates converge toward an optimal jerk limited velocity. The algorithm may be repeated until the exit condition is satisfied.

In performing each iteration of the jerk limited optimization, the jerk limited optimizer may perform the backward pass and forward pass generally described above. In some implementations, the epsilon value is a constant that is held constant across the number of iterations. In some implementations, the epsilon value is a variable that varies across the number of iterations. For instance, the epsilon value may take into account an assessment of convergence between two or more previous iterations.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being implemented in hardware, for example in one or more FPGAs or ASICs.

The various embodiments described above can be combined to provide further embodiments. All of the commonly assigned US patent application publications, US patent applications, foreign patents, and foreign patent applications referred to in this specification and/or listed in the Application Data Sheet, including but not limited International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. Patent Application Ser. No. 62/626,939, filed Feb. 6, 2018, entitled "MOTION PLANNING OF A ROBOT STORING A DISCRETIZED ENVIRONMENT ON ONE OR MORE PROCESSORS AND IMPROVED OPERATION OF SAME"; U.S. Patent Application No. 62/856,548, filed Jun. 3, 2019, entitled "APPARATUS, METHODS AND ARTICLES TO FACILITATE MOTION PLANNING IN ENVIRONMENTS HAVING DYNAMIC OBSTACLES"; U.S. Patent Application No. 62/865,431, filed Jun. 24, 2019, entitled "MOTION PLANNING FOR MULTIPLE ROBOTS IN SHARED ENVIRONMENT"; and U.S. Patent Application Ser. No. 62/890,830, filed Aug. 23, 2019, entitled "MOTION PLANNING FOR ROBOTS TO OPTIMIZE VELOCITY WHILE MAINTAINING LIMITS ON ACCELERATION AND JERK", are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a processor-based system to control motion of a robot, the processor-based system including at least one processor, the method comprising:
for each of a plurality of waypoints $s_i$ from $s_1$ to at least $s_{n-1}$ along a geometric path, there being a corresponding robot configuration $q_i$ for each waypoint $s_i$, linearly determining, by the at least one processor, an estimate of a maximized velocity along the path while applying an acceleration limit to movement represented by the transitions between adjacent ones of the waypoints $s_i$;
following the linearly determining the estimate of a maximized velocity along the path while applying the acceleration limit to movement represented by the transitions between adjacent ones of the waypoints $s_i$, for each of the plurality of waypoints $s_i$ from $s_1$ to $s_{n-1}$ along the geometric path, linearly determining, by the at least one processor, an estimate of a maximized velocity along the path while applying a jerk limit to movement represented by the transitions between adjacent ones of the waypoints $s_i$;
for each of the waypoints $s_i$ from at least $s_2$ to $s_n$ along the geometric path, determining, by the at least one processor, a respective time at which the respective waypoint is to be reached based on respective ones of the determined estimate of the maximized velocity; and
causing the robot to move according to a motion plan that is based at least in part on the determined respective times at which the respective waypoints are to be reached,
wherein linearly determining the estimate of a maximized velocity along the path while applying an acceleration limit to movement represented by the transitions between adjacent ones of the waypoints $s_i$ comprises:
for waypoints $s_i$ successively from at least $s_{n-1}$ through $s_1$, determining a respective range of feasible velocities bound by the acceleration limit at each respective waypoint $s_i$; and
after determining a respective range of feasible velocities bound by the acceleration limit, then for waypoints $s_i$ successively from $s_1$ through $s_{n-1}$, selecting a respective value of acceleration that at least approximately maximizes a velocity squared for each transition between successive waypoints $s_i$ from $s_1$ through at least $s_{n-1}$ such that the respective value of acceleration is within the corresponding acceleration limit and the corresponding velocity is in the respective range of feasible velocities.

2. The method of claim 1 wherein for the waypoints $s_i$ successively from at least $s_{n-1}$ through $s_1$, determining a respective range of feasible velocities bound by the acceleration limit at each respective waypoint $s_i$ comprises: determining a velocity at the waypoint $s_n$ as equaling zero.

3. The method of claim 1 wherein for each of the plurality of waypoints $S_i$ from $S_1$ to $S_n$ along the geometric path, determining a respective time at which the respective waypoint is to be reached based on respective ones of a set of maximized velocities includes determining a time vector that represents a respective relative time at which each of the configurations $q_i$ is to be achieved.

4. The method of claim 3, further comprising:
receiving a configuration vector of n robot configurations $q_i$, the configuration vector having a length n, and wherein determining a time vector that represents a respective relative time at which each of the configurations $q_i$ is to be achieved includes determining a time vector having a length that is equal to the length of the configuration vector.

5. The method of claim 4 wherein receiving a configuration vector of n robot configurations $q_i$ includes receiving a configuration vector that provides a vector of points in a configuration space of the robot, each point specifying a respective pose of each of at least two joints of the robot.

6. The method of claim 1 wherein determining a respective time at which the respective waypoint is to be reached based on respective ones of a set of the determined estimates of maximized velocity, for each of the waypoints $s_i$ from at least $s_2$ to $s_n$ along the geometric path, includes determining a respective relative time at which the respective waypoint is to be reached, the respective relative time relative with respect to a respective time at which at least one preceding waypoint is to be reached.

7. The method of claim 1, further comprising:
generating the motion plan based at least in part on the determined respective times at which the respective waypoints are to be reached; and
supplying the motion plan to control the motion of the robot.

8. A method of operation in a processor-based system to control motion of a robot, the processor-based system including at least one processor, the method comprising:
for each of a plurality of waypoints $s_i$ from $s_1$ to at least $s_{n-1}$ along a geometric path, there being a corresponding robot configuration $q_i$ for each waypoint $s_i$, linearly determining, by the at least one processor, an estimate of a maximized velocity along the path while applying an acceleration limit to movement represented by the transitions between adjacent ones of the waypoints $s_i$;
following the linearly determining the estimate of a maximized velocity along the path while applying the acceleration limit to movement represented by the transitions between adjacent ones of the waypoints $s_i$, for each of the plurality of waypoints $s_i$ from $s_1$ to $s_{n-1}$ along the geometric path, linearly determining, by the at least one processor, an estimate of a maximized velocity along the path while applying a jerk limit to movement represented by the transitions between adjacent ones of the waypoints $s_i$;
for each of the waypoints $s_i$ from at least $s_2$ to $s_n$ along the geometric path, determining, by the at least one processor, a respective time at which the respective waypoint is to be reached based on respective ones of the determined estimate of the maximized velocity; and
causing the robot to move according to a motion plan that is based at least in part on the determined respective times at which the respective waypoints are to be reached,
wherein linearly determining an estimate of a maximized velocity along the path while applying a jerk limit to movement represented by the transitions between adjacent ones of the waypoints $s_i$ comprises:
for waypoints $s_i$, successively from $s_{n-1}$ through $s_1$, determining a respective range of feasible velocities and a respective range of feasible accelerations, each of the ranges bound by the jerk limit at each respective waypoint $s_i$; and
after determining a respective range of feasible velocities and a range of feasible accelerations bound by the jerk limit at each respective waypoint $s_i$, then for waypoints $s_i$ successively from $s_1$ through $s_{n-1}$, selecting a respective value of jerk that at least approximately maximizes a velocity squared for each transition between successive waypoints $s_i$ from $s_1$ through $s_n$ such that the respective value of jerk is within the corresponding jerk limit, the corresponding velocity is in the respective range of feasible velocities, and the corresponding acceleration is in the respective range of feasible accelerations.

9. The method of claim 8, further comprising:
for a number of iterations until an end condition is reached,
for waypoints $s_i$, determining a respective jerk limited velocity based at least in part on a respective input value, the respective input value being equal to the respective input value of a most immediately previous iteration minus an epsilon value, and the epsilon value is either a constant that is held constant across the number of iterations or a variable that varies across the number of iterations.

10. The method of claim 9, further comprising:
determining whether the end condition is reached, by:
determining a difference between the at least approximately maximized velocity squared corresponding to a current selected jerk value and the at least approximately maximized velocity squared corresponding to a most recent previously selected jerk value; and
comparing the determined difference to a threshold value.

11. A system to control motion of a robot, the system comprising:
at least one processor; and
at least one nontransitory processor-readable medium communicatively coupled to the at least one processor and which stores processor-executable instructions which, when executed by the at least one processor, cause the at least one processor to:
for each of a plurality of waypoints $s_i$ from $s_1$ to $s_n$ along a geometric path, there being a corresponding robot configuration $q_i$ for each waypoint $s_i$, linearly determine an estimate of a maximized velocity along the path under an acceleration limit applied to movement represented by the transitions between adjacent ones of the waypoints $s_i$;
following the linear determination of the estimate of a maximized velocity along the path under the acceleration limit applied to movement represented by the transitions between adjacent ones of the waypoints $s_i$, for each of the plurality of waypoints $s_i$ from $s_1$ to $s_n$ along the geometric path, linearly determine an estimate of a maximized velocity along the path under a jerk limit applied to movement represented by the transitions between adjacent ones of the waypoints $s_i$;
for each of the waypoints $s_i$ from at least $s_2$ to $s_n$ along the geometric path, determine a respective time at which the respective waypoint is to be reached based on respective ones of the determined estimate of a maximized velocity; and generate a motion plan based at least in part on the determined respective times at which the respective waypoints are to be reached, the motion plan executable by a robot control system to control motion of the robot, wherein to linearly determine an estimate of a maximized velocity along the path under an acceleration limit applied to movement represented by the transitions between adjacent ones of the waypoints $s_i$ the processor-executable instructions cause the at least one processor to:

for waypoints $s_i$ successively from at least $s_{n-1}$ through $s_1$, determine a respective range of feasible velocities bound by the acceleration limit at each respective waypoint $s_i$; and after the determination of a respective range of feasible velocities bound by the acceleration limit at each respective waypoint $s_i$, then for waypoints $s_i$ successively from $s_1$ through $s_{n-1}$, select a respective value of acceleration that at least approximately maximizes a velocity squared for each transition between successive waypoints $s_i$ from $s_1$ through $s_n$ such that the respective value of acceleration is within the corresponding acceleration limit and the corresponding velocity is in the respective range of feasible velocities.

12. The system of claim 11 wherein to determine a respective time at which the respective waypoint is to be reached based on respective ones of a set of maximized velocities the processor-executable instructions cause the at least one processor to determine a time vector that represents a respective relative time at which each of the configurations $q_i$ is to be achieved.

13. The system of claim 12 wherein the at least one processor receives a configuration vector of n robot configurations $q_i$, the configuration vector having a length n, and wherein to determine a time vector that represents a respective relative time at which each of the configurations $q_i$ is to be achieved the processor-executable instructions cause the at least one processor to determine a time vector having a length that is equal to the length of the configuration vector.

14. The system of claim 11 wherein to determine a respective time at which the respective waypoint is to be reached based on respective ones of a set of the determined estimates of maximized velocity, the processor-executable instructions cause the at least one processor to, for each of the waypoints $s_i$ from at least $s_2$ to $s_n$ along the geometric path, determine a respective relative time at which the respective waypoint is to be reached, the respective relative time relative with respect to a respective time at which at least one preceding waypoint is to be reached.

15. The system of claim 11 wherein, when executed by the at least one processor, the processor-executable instructions cause the at least one processor to further:

provide at least the robot configurations for the respective waypoints and the corresponding determined respective times at which the respective waypoints are to be reached to control motion of the robot; and execute the motion plan that is based at least in part on the determined respective times at which the respective waypoints are to be reached via at least one motion controller of the robot control system to control the motion of the robot.

16. A system to control motion of a robot, the system comprising:

at least one processor; and at least one nontransitory processor-readable medium communicatively coupled to the at least one processor and which stores processor-executable instructions which, when executed by the at least one processor, cause the at least one processor to:

for each of a plurality of waypoints $s_i$ from $s_1$ to $s_n$ along a geometric path, there being a corresponding robot configuration $q_i$ for each waypoint $s_i$, linearly determine an estimate of a maximized velocity along the path under an acceleration limit applied to movement represented by the transitions between adjacent ones of the waypoints $s_i$;

following the linear determination of the estimate of a maximized velocity along the path under the acceleration limit applied to movement represented by the transitions between adjacent ones of the waypoints $s_i$, for each of the plurality of waypoints $s_i$ from $s_1$ to $s_n$ along the geometric path, linearly determine an estimate of a maximized velocity along the path under a jerk limit applied to movement represented by the transitions between adjacent ones of the waypoints $s_i$;

for each of the waypoints $s_i$ from at least $s_2$ to $s_n$ along the geometric path, determine a respective time at which the respective waypoint is to be reached based on respective ones of the determined estimate of a maximized velocity; and generate a motion plan based at least in part on the determined respective times at which the respective waypoints are to be reached, the motion plan executable by a robot control system to control motion of the robot, wherein to linearly determine an estimate of a maximized velocity along the path under a jerk limit applied to movement represented by the transitions between adjacent ones of the waypoints $s_i$ the processor-executable instructions cause the at least one processor to:

for waypoints $s_i$, successively from $s_{n-1}$ through $s_1$, determine a respective range of feasible velocities and a respective range of feasible accelerations, each of the ranges bound by the jerk limit at each respective waypoint $s_i$; and after the determination of a respective range of feasible velocities and a range of feasible accelerations bound by the jerk limit at each respective waypoint $s_i$, then for waypoints $s_i$ successively from $s_1$ through $s_{n-1}$, select a respective value of jerk that at least approximately maximizes a velocity squared for each transition between successive waypoints $s_i$ from $s_1$ through $s_n$ such that the respective value of jerk is within the corresponding jerk limit, the corresponding velocity is in the respective range of feasible velocities, and the corresponding acceleration is in the respective range of feasible accelerations.

17. The system of claim 16 wherein the processor-executable instructions, when executed, cause the at least one processor to further:

for a number of iterations until an end condition is reached, for waypoints $s_i$, determine a respective jerk limited velocity based at least in part on a respective input value, the respective input value being equal to the respective input value of a most immediately previous iteration minus an epsilon value, and the epsilon value is either a constant that is held constant across the number of iterations or a variable that varies across the number of iterations.

18. The system of claim 17, further comprising:
determining whether the end condition is reached, by:
determine a difference between the at least approximately maximized velocity squared corresponding to a current selected jerk value and the at least approximately maximized velocity squared corresponding to a most recent previously selected jerk value; and
compare the determined difference to a velocity threshold value.

19. A method of operation in a processor-based system to control motion of a robot, the processor-based system including at least one processor, the method comprising:
determining, by the at least one processor, a range of feasible acceleration limited velocities for robotic movements represented by transitions between adjacent ones of a plurality of waypoints along a geometric path under an acceleration limit, there being a corresponding robot configuration for each waypoint;
for at least some of the waypoints, selecting, by the at least one processor, an at least approximately maximized feasible acceleration limited velocity from the set of feasible acceleration limited velocities;
determining, by the at least one processor, a range of feasible jerk limited velocities for robotic movements represented by transitions between adjacent ones of a plurality of waypoints along the geometric path under at least an approximate-jerk limit;
for at least some of the waypoints, selecting, by the at least one processor, an at least approximately maximized feasible jerk limited velocity from the range of feasible jerk limited velocities;
for each of at least some of the waypoints, determining, by the at least one processor, a respective time at which the respective waypoint is to be reached based on respective ones of the selected at least approximately maximized jerk limited velocities; and
generating a motion plan based at least in part on the determined respective times at which the respective waypoints are to be reached, the motion plan executable via a robot control system to control motion of the robot,
wherein determining a range of feasible acceleration limited velocities for robotic movements represented by transitions between adjacent ones of a plurality of waypoints along a geometric path under an acceleration limit comprises:
for each of the waypoints $S_i$ successively from at least $s_{n-1}$ through $s_1$, determining a respective range of feasible acceleration limited velocities obtainable under an acceleration limit at each respective waypoint $S_i$; and
selecting an at least approximately maximized feasible acceleration limited velocity from the range of feasible acceleration limited velocities comprises: for waypoints $s_i$ successively from $s_1$ through $s_{n-1}$, selecting a respective value of acceleration that at least approximately maximizes a velocity squared for each transition between successive waypoints $s_i$ from $s_1$ through $s_n$.

20. The method of claim 19, further comprising:
until an end condition is reached, repeatedly:
determining a new range of feasible jerk limited velocities for robotic movements represented by transitions between adjacent ones of a plurality of waypoints along the geometric path under at least an approximate-jerk limit; and
for at least some of the waypoints, selecting an at least approximately maximized feasible jerk limited velocity from the new range of feasible jerk limited velocities.

21. The method of claim 20, further comprising:
determining with the end condition is reached by at least one of: determining whether a difference between successive selections of the at least approximately maximized feasible jerk limited velocity is at or below a threshold value or determining whether a defined number of iterations has been reached.

22. The method of claim 19, further comprising:
executing, by the robot control system, the motion plan that is based at least in part on the determined respective times at which the respective waypoints are to be reached to cause motion of the robot.

23. A method of operation in a processor-based system to control motion of a robot, the processor-based system including at least one processor, the method comprising:
determining, by the at least one processor, a range of feasible acceleration limited velocities for robotic movements represented by transitions between adjacent ones of a plurality of waypoints along a geometric path under an acceleration limit, there being a corresponding robot configuration for each waypoint;
for at least some of the waypoints, selecting, by the at least one processor, an at least approximately maximized feasible acceleration limited velocity from the set of feasible acceleration limited velocities;
determining, by the at least one processor, a range of feasible jerk limited velocities for robotic movements represented by transitions between adjacent ones of a plurality of waypoints along the geometric path under at least an approximate-jerk limit;
for at least some of the waypoints, selecting, by the at least one processor, an at least approximately maximized feasible jerk limited velocity from the range of feasible jerk limited velocities;
for each of at least some of the waypoints, determining, by the at least one processor, a respective time at which the respective waypoint is to be reached based on respective ones of the selected at least approximately maximized jerk limited velocities; and
generating a motion plan based at least in part on the determined respective times at which the respective waypoints are to be reached, the motion plan executable via a robot control system to control motion of the robot,
wherein determining a range of feasible jerk limited velocities for robotic movements represented by transitions between adjacent ones of a plurality of waypoints along the geometric path under at least an approximate-jerk limit comprises:
for waypoints $s_i$, successively from $s_{n-1}$ through $s_1$, determining a respective range of feasible velocities and a respective range of feasible accelerations obtainable under a jerk limit and under an acceleration limit at each respective waypoint $s_i$; and
for each of at least some of the waypoints, determining a respective time at which the respective waypoint is to be reached based on respective ones of the selected at least approximately maximized jerk limited velocities comprises: for waypoints $s_i$ successively from $s_1$ through $s_{n-1}$, selecting a respective value of jerk that at least approximately maximizes a velocity squared for each transition between successive waypoints $s_i$ from $s_1$ through $s_n$.

24. The method of claim 23 wherein determining a range of feasible jerk limited velocities for robotic movements represented by transitions between adjacent ones of a plurality of waypoints along the geometric path under at least an approximate-jerk limit includes, for a number of iterations until an end condition is reached, for waypoints $s_i$, determining a respective jerk limited velocity based at least in part on a respective input value, the respective input value being equal to the respective input value of a most immediately previous iteration minus an epsilon value, and the epsilon value is either a constant that is held constant across the number of iterations or a variable that varies across the number of iterations.

\* \* \* \* \*